Figure 1:
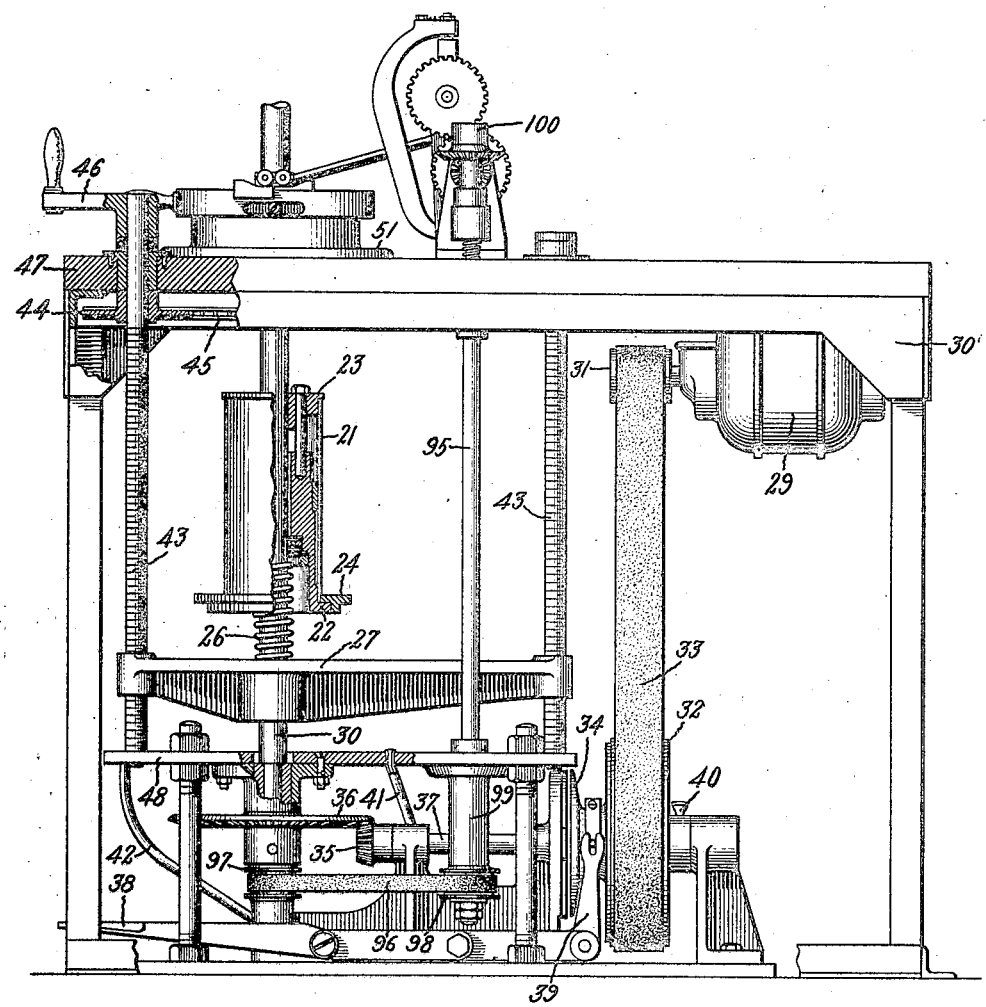

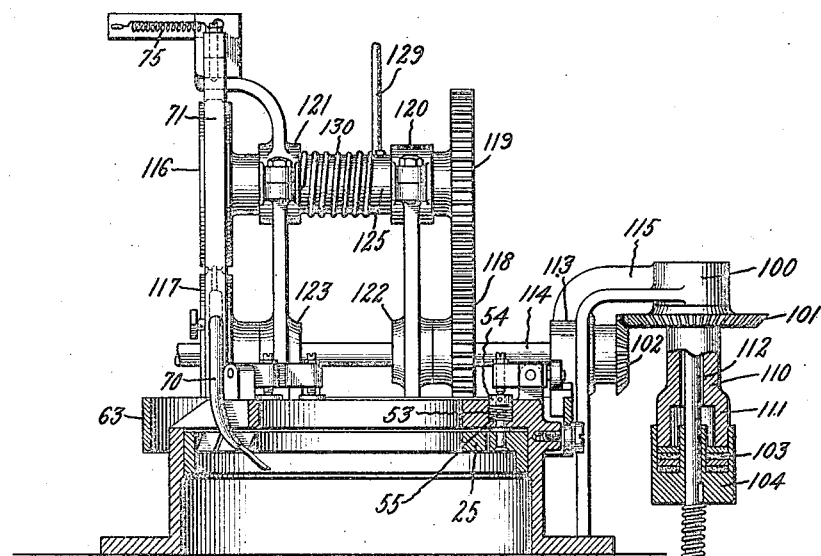
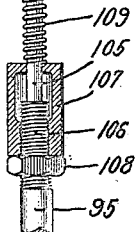
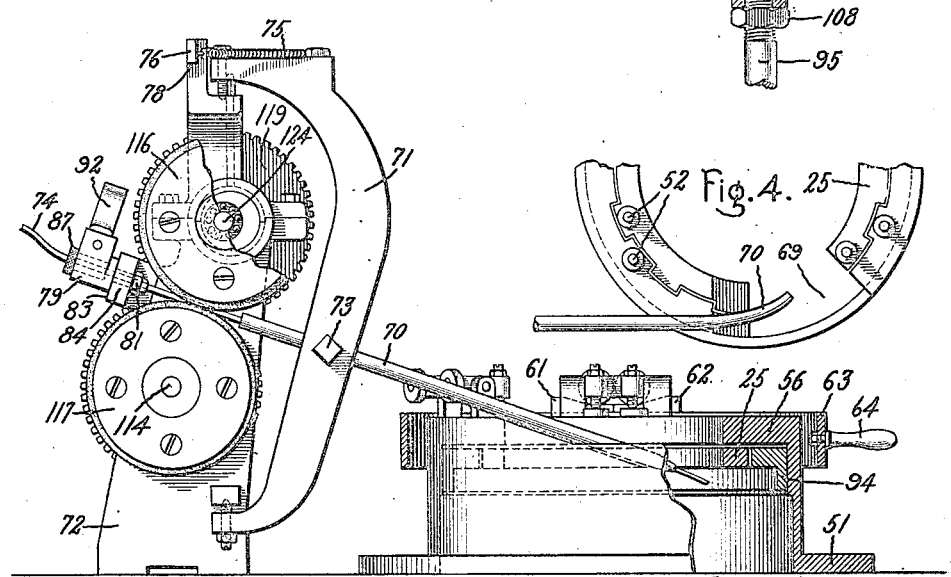

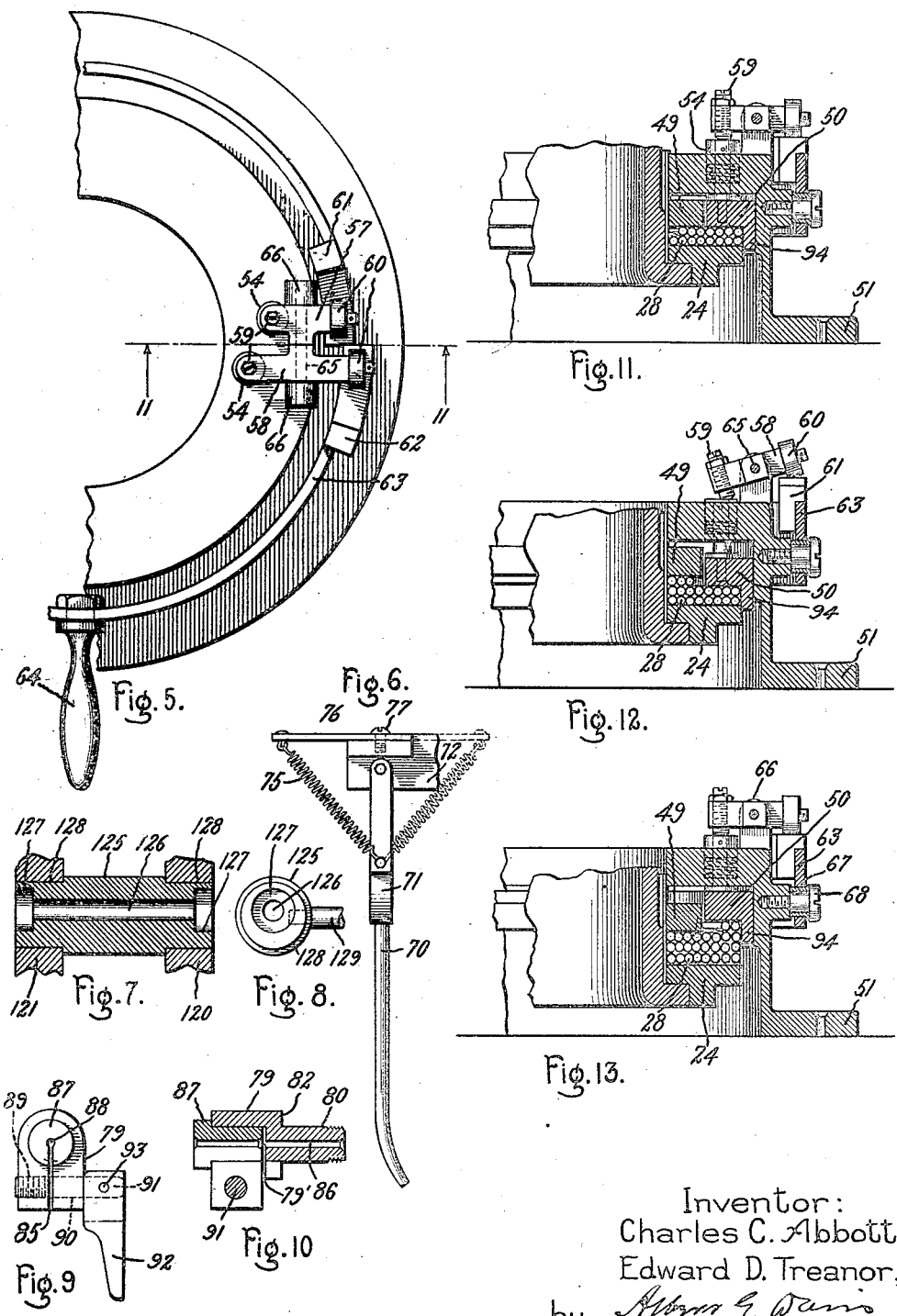

Patented Feb. 6, 1923.

1,444,441

UNITED STATES PATENT OFFICE.

CHARLES C. ABBOTT AND EDWARD D. TREANOR, OF PITTSFIELD, MASSACHUSETTS, ASSIGNORS TO GENERAL ELECTRIC COMPANY, A CORPORATION OF NEW YORK.

WINDING MACHINE.

Application filed March 26, 1921. Serial No. 455,329.

*To all whom it may concern:*

Be it known that we, CHARLES C. ABBOTT and EDWARD D. TREANOR, citizens of the United States, residing at Pittsfield, county of Berkshire, State of Massachusetts, have invented certain new and useful Improvements in Winding Machines, of which the following is a specification.

This invention relates to winding machines, and more particularly to machines for winding coils in flat spirals.

When an electrical conductor is wound into a coil for use in such apparatus as transformers, for example, it is necessary to insulate the layers of conductors from each other with greater care than the individual turns, since the electrical potential from layer to layer is proportional to the number of turns in each layer and also to the potential between each turn. If each layer contains a large number of turns it is evident that there may be a very high difference of potential existing between adjacent layers, so that a comparatively large amount of insulation is required. Thus in a coil having a definite terminal voltage applied thereto and a definite number of turns, if there be only a small number of layers the entire voltage applied to the terminals of the coil is divided only into as small a number of parts as there are layers, and the voltage between one turn and the turn immediately under or over it may reach a correspondingly high value. One way of reducing the voltage, and therefore the insulation, in a coil is by increasing the number of layers. In an ordinary coil having a rather long cylindrical body and a shallow winding this result is accomplished by winding the first layer in a flat spiral against the end collar of the cylinder, in the manner of a clock spring, and then winding the succeeding layers in the same way so that there are a large number of layers extending from one end of the spool flange to the other. Under such circumstances since less insulation is used, there is a corresponding immediate improvement in the space factor, or the ratio of useful conductor to the entire space occupied by the winding.

Attempts have been made to construct machines for winding the coils in such flat spirals, but mechanical drawbacks arise since it is difficult to support the portions of the coil that are already wound during the winding operation. It is the main object of our invention to provide such a machine having few parts capable of performing the necessary operations. More specifically, one of the objects of our invention is to provide a proper support for the flat spirals after they are wound so that they may be held in place while the succeeding layers are wound; other objects and advantages of our invention will become apparent as the description proceeds.

For a better understanding of our invention attention is directed to the following specification and accompanying drawings, in which Figure 1 is a general assembly view of the machine; Fig. 2 is a sectional view to a larger scale of the top of the machine showing in greater detail the feeding mechanism; Fig. 3 is a view taken from the left of Fig. 2 showing how the conductor to be wound is fed to the machine; Fig. 4 is a detail view showing the configuration of one of the presser plates between which the coil is wound; Fig. 5 is a top plan view showing some of the operating parts by means of which the sections of the stationary presser plate are operated; Fig. 6 is a detail view showing the nozzle and cooperating parts for feeding the conductor to the machine; Fig. 7 is a detail sectional view showing the construction of means whereby the feed mechanism is rendered inoperative; Fig. 8 is an end view of the same; Fig. 9 shows in detail a part of the machine used for determining the amount of tension used for winding the coil, and Fig. 10 is a sectional view of the same device; Figs. 11, 12 and 13 show three stages in the process of winding a coil by this machine, and illustrates how that part of the coil which is already wound is supported in the machine while it is in operation. These three figures are taken along line 11, 11 of Fig. 5 and are views in the direction of the arrows.

Referring now more in detail to the drawings in which like reference characters refer to like parts throughout, we show in Fig. 1 a spool body 21 clamped between the end flanges 22 and 23, and a rotatable annular presser plate 24. The conductor is wound in flat spirals, layer upon layer between the presser plate 24 and the cooperating presser plate 25 shown in greater detail in Figs. 2, 3 and 4. In Fig. 1 we have shown the spool body 21 as depressed to an inoperative position against the tension of the spring 26 resting upon a flat bed casting member 27. The operative position of the presser plate 24 and of the spool body 21 may be best seen by referring to Figs. 11, 12 and 13, in which there is also shown the wound portion of a coil 28.

We provide appropriate means for rotating the presser plate 24 and the associated parts 21, 22, and 23. For doing this any source of rotary motion may be used and we show in this instance an electric motor 29 supported on the frame 30', which frame also serves as a general support for all of the parts of the machine. The motor 29 by means of belting and gearing transmits rotary motion to the shaft 30 to which is splined the end flanges 22 and 23, the spline permitting relative axial movement of the spool body 21 and the shaft. The motion transmitting mechanism from the motor 29 to the shaft 30 comprises the pulleys 31 and 32, belt 33, clutch 34 and bevel gears 35 and 36. One of the faces of the clutch 34 is in this instance arranged to be moved axially of a supporting shaft 37 so as to engage the other member of the clutch by means of a foot pedal 38 and a fork 39 in the well known manner. Since it is quite immaterial where or how the rotary motion is produced, it is not considered essential to describe in greater detail the motion transmitting apparatus. Suffice it to say that appropriate bearing members are provided, as well as means for oiling them, such as oil cups 40 and tubes 41 and 42.

As the coil 28 is wound, it is of course necessary that the members 22 and 23 as well as the rotatable presser plate 24 move downward axially of the shaft 30. As the coil is wound this movement takes place automatically, since the spring 26 is compressed by the downward thrust of the plate 24 as more and more layers of the coil 28 are wound. However, in order to prevent too great a compression of the spring 26 or to enable an entire coil to be wound, we provide means for lowering the plate member 27 upon which the spring 26 rests so as to reduce its compression after it has been compressed by the downward movement of the presser plate 24. For this purpose we utilize a series of screw shafts 43 threaded through the plate 27 and mechanically connected together by means of sprocket wheels 44, one of which is shown in Fig. 1, and a sprocket chain 45 passing around all of the sprocket wheels. Upon one of the screw shafts 43 there is provided a manually operable handle 46. Appropriate roller bearings may be provided for each of the screw shafts 43 in the top plate 47 of the frame 30' and these screw shafts are also journaled in the stationary plate 48 which forms a part of the supporting structure. It is evident that upon rotation of the handle 46, the screw shafts raise or lower the plate 27 which compresses or expands the spring 26.

A stationary presser plate 25 is used for supporting the spirals. The bottom surface of this presser plate where it contacts with the conductor which is being wound is made smooth enough so that very little friction is present opposing the movement of the conductor upon said surface. Such a stationary presser plate has the advantage that it is easily adjustable, is extremely simple, and the flat spiral as it is being wound has a uniform support. However, where the radial depth of the winding is considerable, a presser plate made up of a single section may not serve to support the winding very well. For this reason, presser plate 25 is made up of a plurality of sections, in this instance two sections which are independently movable toward or from the stationary presser plate 24. It is thus possible after a portion of any single spiral is wound to support this portion as well as the preceding layer not covered by the portion, by causing the active surfaces of the presser plate sections to be at different levels. When the layers are started, the first turn is thus relieved of most of the pressure of spring 26, and it may easily be wound. Referring now to Figs. 11, 12 and 13, this effect is clearly brought out in the various stages of the winding. Fig. 11 shows the second spiral being wound, all but the last turn of this spiral having been completed. Under such circumstances the two sections 49 and 50 of the stationary presser plate 25 are located in the same plane. Fig. 12 shows the third of the spirals being wound. Under such circumstances the outer annular section 50 of the stationary presser plate 25 is depressed by appropriate mechanism to be described later. The resulting relative positions of the two sections 49 and 50 are represented in Fig. 12 and it is seen that the outer porton of the second spiral is pressed between this outer section and the rotatable presser plate 24, while the inner portion of the succeeding spiral is wound and supported by inner section 49. This has the important effect of providing a winding space for the beginning of the layer without great side pressure on the first few turns. Were the stationary presser plate made in a single portion it would be impossible to accomplish this result, and it would be hard to introduce the first turns between the two presser plates. Fig. 13 shows how the inner section 49 of the stationary presser plate 25 is used to support the inner portion of the third spiral, while the fourth spiral is being started. For this purpose the section 49 is depressed.

The stationary presser plate 25 is appropriately supported by means of support 51 fastened to the top member 47 of the frame 30'. This member 51 is a ring-shaped casting, the form of which is clearly shown in Figs. 2 and 3, so as to permit the spool body 21 to pass therethrough, as illustrated in Figs. 11, 12 and 13. The sections 49 and 50 of the stationary presser plate 25 each have a series of studs 52 located around a circle, said studs passing through appropriate counterbored holes 53 shown in Fig. 2 of the support 51. These studs have collars 54, fastened to them; and between the collars 54 and the bottom of the counterbore is interposed a compression spring 55. It is evident from this description that these springs 55 acting under the collar 54 urge the studs 52 upwardly until the upper surfaces of the stationary presser plate 25 contact with the lower surface of the annular portion 56 of the support 51. It is also evident that by depressing the collars 54 the springs 55 may be depressed and the stationary presser plate 25 correspondingly moved or urged toward the rotatable presser plate 24. The depression of the collars 54 may be accomplished by any appropriate mechanism. We provide in this instance a series of pivoted levers 57 and 58 at one end of which screws 59 are carried, while at the other end rollers 60 are pivoted, as is clearly shown in Figs. 5, 11, 12 and 13. Coacting with these rollers 60 are cams 61 and 62 which are supported on a rotatable or oscillatable ring 63. The arrangement is such that when this ring 63 is manually rotated or oscillated by means of a handle 64, said cams 61 and 62 coact either with levers 57 or with levers 58. If levers 57 are depressed by the rotation of ring 63 in a clockwise direction from the position shown, which rotation causes actuation of cam 61, then the outer section 50 of the stationary presser plate is moved downward; while on the other hand if rotation of ring 63 is in such a direction as to cause cam 62 to pass under the rollers carried by the pivoted lever 58, then the inner section 49 of the stationary presser plate 25 is depressed. The cams 61 and 62 are radially displaced from each other, as well as the rollers on levers 57 and 58, so that each set is independently operable by rotation of the ring 63 from neutral. In the present instance we use three or more levers 58 and a corresponding number of levers 57 which are pivoted on shafts 65 held in bosses 66 cast integral with support 51. For supporting the rotatable or oscillatable ring 63 we provide hollow roller bearings 67 through which pass screws 68 fastened to the support 50, as clearly shown in Figs. 11, 12 and 13. These roller bearings engage into slots cut into the ring 63. In this way practically frictionless support is obtained. In the position shown in Fig. 5 neither of the levers 57 or 58 are rotated out of a horizontal position, since the rollers 60 are on the low portions of the cams 61 and 62. This is most clearly seen in Fig. 3. Rotation of the ring 63 in one direction or the other from its neutral position will, as explained before, cause rotation of levers 57 or 58 to depress either the inner or outer section of the stationary presser plate 25.

It is evident that if the sections 49 and 50 be divided by a circular division line, then it would be possible for the middle turn in any spiral to get stuck in the space between the two sections and the device may not operate very satisfactorily. To obviate this difficulty we make the line of partition between the sections 49 and 50 non-circular. For example, we may make the line of partition of the form shown in Fig. 4. In this way there is no continuous space which could accommodate any of the turns of a spiral. It is also evident from an inspection of Fig. 4 that there is a space 69 where the sections 49 and 50 are cut away in order to accommodate a feeding nozzle 70 through which the conductor passes as it is fed to the machine.

We employ proper means whereby the spirals are tightly wound. These means consist in so controlling the speed at which the conductor is fed to the machine that there is an appreciable force pressing adjacent conductors together as they are wound on the same spiral. These results are obtained by providing means for under feeding the conductor while it is wound from the inside of the spiral to the outside, and in providing means tending to overfeed the conductor while it is wound from the outside of the spiral to the inside. In the example illustrated in Figs. 11, 12 and 13 the first spiral is wound from the inside to the outside. While this takes place an underfeeding is provided by passing the conductor through a friction device which imposes a frictional load upon the conductor as it is pulled in by the rotation of the presser plate 24 and the spool body 21. The details of this device will be described later. In Fig. 3 the nozzle 70 is shown as connected to a swinging bracket 71 pivoted on a stationary support 72. The nozzle 70 is fastened to the bracket 71 by means of the set screw 73. The conductor is shown at 74 and as the radius of the turn varies while the spirals are wound the bracket 71 swings and compensates for this variation in radius. In order to urge the nozzle 70 either inwardly or outwardly depending upon whether the spiral is wound from the inside or the outside respectively, a tension spring 75 is provided. Fig. 6 shows how this tension spring is used for effecting this purpose. One end of the spring is fastened to the swinging bracket 71 while the other end is fastened to a strap 76 pivoted to the stationary support 72 by appropriate means such as screw 77. The stationary support 72 is cut away at 78 as shown in Fig. 3 to provide a shoulder for the strap 76. While the wire is wound from the outside to the inside of the spiral, the position of the spring 75 is as shown in Fig. 6 since under such circumstances it tends to pull the nozzle 70 outwardly. When the conductor is wound from the inside to the outside, however, the strap 76 is turned about its pivot screw 77 and the spring takes on the dotted line position shown in Fig. 6 so that it urges the nozzle 70 inwardly.

Referring now in greater detail to Figs. 3, 9 and 10 to show how the friction load is imposed upon the conductor 74 while it is wound from the inside of the spiral to the outside, there is a supporting member 79 held to the stationary support 72 by means of the stud 80 formed integrally with the member 79, and by means of the nut 81. The shoulder 82 of the support 79 is thus clamped securely against the shoulder 83 of the projection 84 provided on the supporting member 72. This supporting member is split as by means of a saw-cut at 85 and has an aperture 86 extending through it. A counterbore provided for the aperture accommodates a split bushing 87 of some material such as fibre, which bushing has an aperture 88 through it which aligns with the aperture 86 through the member 79. Through these apertures the conductor 74 passes. There is provided means for clamping the bushing 87 tightly so as to cause friction to be exerted upon the conductor 74 as it is pulled through these apertures. For this purpose the member 79 is provided with a tapped hole 89 and an aperture 90, as shown clearly in Fig. 9. A saw cut 79' on a level with the bottom of the counterbore and extending part way through the member 79 is provided so as to give the counterbored portion more flexibility. Into the tapped hole is arranged to be threaded a stud 91 to which is pivoted a hand-operated cam 92 at the point 93. It is evident that by rotating cam 92 about its pivot 93 at right angles to the position shown in Fig. 9 and in a counterclockwise direction, the pressure upon the bushing 87 may be released. Upon a reverse movement the pressure may be reapplied. Furthermore, this pressure may be controlled by using the cam 92 as a handle for the stud 91 by means of which it may be turned in or out of the threaded hole 89.

While the conductor 74 is being wound from the outside to the inside, the bushing 87 is released and instead there is provided means tending to overfeed the conductor 74. In order that this overfeeding may serve to exert an effective axial force on the conductors, there is provided a depending flange 94 on the outer section 50 of the stationary presser plate 25. This flange acts as an abutment for the conductor 74 when the spiral is started. The very first turn which is wound in the spiral engages the inner wall of the flange 94 and is pressed against it due to the overfeeding that has been mentioned heretofore. This first turn likewise acts as an abutment for the succeeding turn. The overfeeding, as is evident, serves to impart an appreciable axial thrust to each succeeding turn as it is wound on the spiral, tending to push it outwardly against the previous turn. To provide this overfeeding there is utilized an auxiliary shaft 95, Fig. 1, driven from any appropriate source. This source may, for example, be the same as that utilized to drive the main shaft 30. As shown in Fig. 1, the rotation of shaft 95 is obtained in this instance by means of a belt 96 connecting pulleys 97 and 98 respectively fastened to shafts 30 and 95. The shaft 95 is appropriately supported in bearing 99 at its bottom and bearing 100 at the top. This shaft 95 rotates a beveled gear 101 which in turn serves to rotate the beveled gear 102.

Since the rotation of shaft 95 is made fast enough so that there is always a tendency for the conductor 74 to be overfed, it is evident that some means must be provided whereby the excess revolutions of the shaft may be rendered ineffective. To accomplish this object there is provided a frictional slipping clutch somewhere in the transmission from shaft 95 to the feed. Such a frictional slipping clutch is most clearly shown in Fig. 2 and in this instance comprises a plurality of friction discs 103 made up of alternate layers of steel and fibre. These friction discs 103 are held in an appropriately formed shell member 104 splined to the shaft 105 which is fastened by means of the screw threads 106, coupling 107 and nut 108 to the drive shaft 95. Screw threads 106 and coupling member 107 serve as adjusting means for the tension of the compression spring 109 which serves to compress the friction discs 103. The member 104 has telescoped within it a hub 110 which carries the beveled gear 101. The depending flange 111 of this hub 110 engages with the uppermost of the friction discs 103 whereby a frictional drive is obtained for the gear 101. Furthermore, the hub 110 has an aperture 112 sufficiently large in diameter to clear the shaft 105, as clearly shown in Fig. 2. The bearing member 100 for the shaft 105 and the bearing member 113 for the shaft 114 which is fastened to the driven beveled gear 102 are appropriately formed on a bracket member 115 supported upon the top member 47 of the supporting structure 30'.

The rotation of shaft 114 is utilized to drive the feed rolls 116 and 117. These feed rolls are shown most clearly in Figs. 2 and 3 and carry on their outer faces some such material as fibre which serves to grip the conductor 74 while the feed rolls 116 and 117 are rotated. The feed roll 117 is connected to shaft 114, while the feed roll 116 is driven through gears 118 and 119. The latter gear is connected to the same shaft as feed roll 116, said shaft being appropriately supported in stationary members 120 and 121 which are carried on the support 72. This support 72 also carries the bearing members 122 and 123 for the feed roll shaft 114. The feed rolls 116 and 117 are of course so arranged that their bite comes into alignment with the place where the conductor 74 is fed through the nozzle 70. It is evident from this description that the slipping clutch comprising the friction discs 103 and the associated parts take up the excess motion which shaft 95 has over that required to supply conductor 74 to the machine.

It is essential that the feed rolls be rendered inactive except while the conductor 74 is wound from the outside to the inside of the spiral. There is accordingly provided appropriate means for rendering the feed inoperative while the conductor 74 is wound from the inside to the outside. For this purpose there is provided an eccentric supporting arrangement for shaft 124, most clearly illustrated in Figs. 2, 7 and 8. The shaft 124 to which are fastened the gear 119 and the feed roll 116 is not directly journaled in the supports 120 and 121 but instead is carried in a member 125 through which there is bored an eccentric aperture 126 accommodating shaft 124. Counterbores 127 are provided at each end of the aperture 126 which serve to hold ball-bearings for the shaft 124 so as to reduce the friction of the drive to a minimum. The member 125 has a turned portion 128 at each end which fit into the members 120 and 121. It is evident that by rotating the member 125 the center of the aperture 126 may be made to approach the center of the shaft 114 which carries the feed roll 117 or to recede therefrom, since the aperture 126 is eccentric of the apertures in the bearing members 120 and 121. All that is necessary therefore to disconnect the gear 119 from 118 is to rotate this eccentric member 125 so as to lift the center of shaft 124 away from the center of shaft 114 and thus to disengage the two gears. To perform this function, a handle 129 is attached to the eccentric member 125 by means of which this eccentric member may be rotated. A spring 130 coiled about the eccentric member 125 is utilized to hold the gear 119 normally in mesh with gear 118. It is therefore necessary to depress handle 129 and keep it depressed if it is necessary to render the feed ineffective, as for example, while the conductor 74 is wound from the inside to the outside of the spiral.

The operation of this machine may be rendered clearer by the following explanation. Assume that the first layer of the coil is wound from the inside to the outside of the spool, and that the next layer is wound from the outside to the inside. This order is then kept up for each succeeding pair of layers. For the start the gear wheel 119 is held out of mesh with gear wheel 118 so that the feed rolls 116 and 117 do not bite the conductor 74. The conductor 74 is led through the apertures 86 and 88, through parts 79 and 87, then through the feed nozzle 70. The conductor is then in any well known manner anchored to the spool body 21. After this is done, the tension of spring 26 is adjusted by means of raising or lowering the flat plate 27 by turning the handle 46. After this tension is properly adjusted the tension on the conductor 74 is also adjusted by means of the stud 91 which serves to clamp the bushing 87 through which the conductor 74 passes. It is evident that a variety of bushings may be used with different apertures therethrough so that different diameter wire or different shapes of cross sections may be utilized for the conductor in winding the coil. The motor 29 is now started and the rotatable presser plate 24 therefore rotates and serves to pull the conductor 74. The tension of spring 26 is sufficient to cause an appreciable pressure between the stationary presser plate 25 and the rotatable presser plate 24. At the beginning of the first layer the outer section 50 of the stationary presser plate contacts with the rotatable presser plate 24, while the inner section 49 is pushed away from the rotatable presser plate by the interposition of conductor 74. This condition is shown in Fig. 12 which shows the third layer being wound. The winding of the third layer is exactly similar to the winding of the first layer. To cause the outer section 50 to remain in contact with the presser plate 24, rotatable ring 63 is oscillated by means of handle 64 in a clockwise direction as viewed in Fig. 5. This has the effect of actuating cam 61 so that the pivoted levers 57 serve to depress the studs 59 connected to the outer section 50. The ring 63 is rotated until there is enough space between the inner section 49 and the rotatable presser member 24 to accommodate the conductor 74. The depression of the outer section 50 causes a corresponding depression of the stationary presser member 24 against the action of spring 26. When the first layer is partially wound the conductors themselves serve to separate the two presser plates and by the time half of this first layer is wound it is necessary to raise the outer section in order that the winding may be continued. Under such circumstances the ring 63 is rotated back to its neutral position and the presser plate sections 49 and 50 are in the position shown in Fig. 11. After the first layer is wound, the second layer starts from the outside to the inside. For this purpose the clamping stud 90 is released by means of the cam 92 so that the conductor 74 does not have to be pulled through the aperture 88 with any great amount of friction. After this is done the gear wheels 119 and 118 are allowed to engage. This renders the feed operative and causes the conductor 74 to be fed against the depending flange 94 of the outer section 50 of the stationary presser plate 25. In order to enable this second layer to be started while at the same time the inner portion of the first layer may be supported, the inner section 49 is depressed by rotating the ring 63 in a counter-clockwise direction which causes actuation of the pivoted levers 58. This has the effect of depressing the rotatable presser plate 24 still further against the action of spring 26. The relative position of the two sections of the stationary presser plate is shown in Fig. 13 for this condition. It is evident that while the outer portion of the spiral layer is being started, the inner portion of the last turn is prevented from unraveling by the aid of the inner section 49. When the layer is about half wound the section 49 may be raised by returning the ring 63 to neutral position. This condition is shown in Fig. 11 for the second turn. The excess rotation of shaft 95 is taken care of in the slipping clutch shown in Fig. 2 and assists in packing each succeeding turn against the last one for this winding operation. After the second layer is wound, the third layer is started in the same manner that the first one was and this process is carried on indefinitely until the coil is completed. Changing from layer to layer necessitates starting and stopping the apparatus which may be accomplished most expeditiously by means of the foot pedal 38 provided for controlling the clutch 34. As more and more layers are wound, it may be necessary to readjust the tension of spring 26 by lowering the flat plate member 27.

While there is shown in the accompanying drawings but one embodiment of the invention, it is not limited thereto and we aim to embrace in the appended claims all modifications falling fairly within the scope of our invention.

What we claim as new and desire to secure by Letters Patent of the United States, is,—

1. In a machine for winding coils in flat spirals, a pair of annular presser plates between which the spirals are wound, and means for urging said plates together, one of said plates being made in a plurality of concentric rings.

2. In a machine for winding coils in flat spirals, a pair of annular presser plates between which the spirals are wound, one of said plates being made in annular portions relatively movable in a direction toward or from the other presser plate.

3. In a machine for winding coils in flat spirals, a rotatable annular presser plate, means for rotating said plate, a non-rotatable presser plate, means for urging said plates together, said non-rotatable presser plate being made in portions relatively movable in a direction toward or from the other presser plate, and means for feeding a conductor between said presser plates.

4. In a machine for winding coils in flat spirals, a pair of annular presser plates between which the spirals are wound, one of said plates comprising relatively movable ring sections, the line of partition between the sections being non-circular, and means for urging said plates together.

5. In a machine for winding coils in flat spirals, a rotatable presser plate, means for rotating said plate, a non-rotatable presser plate comprising relatively movable portions, means for urging any of said portions toward the rotatable presser plate, and means for feeding a conductor between said presser plates.

6. In a machine for winding coils in flat spirals, a rotatable presser plate, a non-rotatable presser plate comprising relatively movable ring sections, means for moving said sections relatively to each other, and means for pressing the winding between the plates.

7. In a machine for winding coils in flat spirals, a rotatable presser plate, a non-rotatable presser plate comprising relatively movable ring sections, pivoted levers arranged to move each ring section, and means for rotating said levers.

8. In a machine for winding coils in flat spirals, a rotatable presser plate, a non-rotatable presser plate comprising relatively movable ring sections, supports for the presser plates, the sections of the non-rotatable presser plate being independently supported, and means for independently urging said sections toward the rotatable presser plate comprising pivoted levers, arranged when rotated to depress the plate section, said pivoted levers being arranged around a circle, a rotatable ring, cams carried by said ring, and so arranged that when the ring is rotated in one direction, one of the sections of the non-rotatable presser plate is depressed, while rotation in the other direction, causes rotation of other pivoted levers to depress another section of the presser plate.

9. In a machine for winding coils in flat spirals, a rotatable presser plate, a non-rotatable presser plate comprising relatively movable ring sections, an oscillatable ring, and means whereby oscillations of said ring in one or the other direction causes certain of the non-rotatable presser plate sections to be urged toward the rotatable presser plate.

10. In a machine for winding coils in flat spirals, a rotatable presser plate, means for rotating said plate, a non-rotatable presser plate comprising relatively movable ring sections, an oscillatable ring, cams carried by said ring so arranged as to urge one of the sections of the non-rotatable plate against the rotatable plate upon rotation of the ring from a neutral position.

11. In a machine for winding coils in flat spirals, a pair of presser plates, a compression spring urging said plates together, a plate member supporting said spring, and a plurality of screw shafts arranged for simultaneous operation for adjusting the position of the plate member.

12. In a machine for winding coils in flat spirals, a pair of presser plates, a compression spring urging said plates together, a plate member supporting said spring, a plurality of screw shafts threaded in said plate member, sprocket wheels on each shaft, a common sprocket chain engaging said wheels, and means for turning one of said shafts.

In witness whereof, we have hereunto set our hands this 23rd day of March, 1921.

CHARLES C. ABBOTT.
EDWARD D. TREANOR.